(12) United States Patent
Nakakuki et al.

(10) Patent No.: US 12,091,101 B2
(45) Date of Patent: Sep. 17, 2024

(54) STEERING INPUT DEVICE FOR STEER-BY-WIRE

(71) Applicant: HITACHI ASTEMO, LTD., Hitachinaka (JP)

(72) Inventors: Yasuhito Nakakuki, Hitachinaka (JP); Makoto Kimura, Hitachinaka (JP); Huajun Liu, Hitachinaka (JP); Atsushi Hirata, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 231 days.

(21) Appl. No.: 17/797,508

(22) PCT Filed: Feb. 3, 2021

(86) PCT No.: PCT/JP2021/003925
§ 371 (c)(1),
(2) Date: Aug. 4, 2022

(87) PCT Pub. No.: WO2021/157610
PCT Pub. Date: Aug. 12, 2021

(65) Prior Publication Data
US 2023/0059965 A1 Feb. 23, 2023

(30) Foreign Application Priority Data
Feb. 5, 2020 (JP) ................. 2020-017745

(51) Int. Cl.
*B62D 5/00* (2006.01)
*B62D 5/04* (2006.01)
(Continued)

(52) U.S. Cl.
CPC ......... *B62D 5/006* (2013.01); *B62D 15/0235* (2013.01); *H02K 7/108* (2013.01); *H02K 11/215* (2016.01)

(58) Field of Classification Search
CPC ........... B62D 5/004; B62D 5/006; B62D 5/04
See application file for complete search history.

(56) References Cited

U.S. PATENT DOCUMENTS

2006/0234537 A1* 10/2006 Sugitani ................ B62D 5/003
439/164
2009/0260913 A1* 10/2009 Ito .......................... B62D 5/003
180/444
(Continued)

FOREIGN PATENT DOCUMENTS

JP 2019-098810 A 6/2019

OTHER PUBLICATIONS

International Search Report dated Mar. 30, 2021 issued in International Application No. PCT/JP2021/003925, with English translation, 5 pages.
(Continued)

*Primary Examiner* — Long T Tran
(74) *Attorney, Agent, or Firm* — Foley & Lardner LLP (57) ABSTRACT

A steering input device for steer-by-wire, according to the present invention, includes a steering shaft that is mechanically separated from a steered wheel, a reaction force motor that applies a steering load to the steering shaft, a lock mechanism that regulates rotation of the steering shaft, a steering amount sensor that detects an operation amount of the steering shaft and outputs an operation amount signal, and a controller. The controller increases the reaction torque generated by the reaction force motor after the starting switch of the vehicle is switched to an OFF state, and after the reaction torque is increased, switches the lock mechanism to a locked state. Thereby, it is possible to suppress an uncomfortable sensation of the driver in steering, while suppressing occurrence of a phase shift between the steering (Continued)

wheel and the steered wheel when the starting switch of the vehicle is switched to the OFF state.

21 Claims, 7 Drawing Sheets

(51) Int. Cl.
  *B62D 15/02* (2006.01)
  *H02K 7/108* (2006.01)
  *H02K 11/215* (2016.01)

(56) References Cited

U.S. PATENT DOCUMENTS

| | | | |
|---|---|---|---|
| 2012/0111658 A1* | 5/2012 | Hori | B62D 6/008 |
| | | | 180/446 |
| 2015/0006033 A1* | 1/2015 | Sekiya | B62D 5/001 |
| | | | 701/41 |
| 2016/0347356 A1* | 12/2016 | Matsuda | B62D 5/003 |
| 2018/0141553 A1* | 5/2018 | Katayama | B60W 10/20 |
| 2021/0237793 A1* | 8/2021 | Fujita | B62D 5/001 |
| 2021/0387665 A1* | 12/2021 | Seo | B62D 15/0215 |

OTHER PUBLICATIONS

International Preliminary Report on Patentability dated Jul. 28, 2022 issued in International Application No. PCT/JP2021/003925, with English translation, 10 pages.

\* cited by examiner

FIG.1

VEHICLE FRONT SIDE

STEERING INPUT DEVICE FOR STEER-BY-WIRE

TECHNICAL FIELD

The present invention relates to a steering input device for steer-by-wire.

BACKGROUND ART

A steer-by-wire system according to Patent Document 1 includes a first lock device that regulates the rotation of a steering device when a lock is activated, a second lock device that regulates steering of a steered wheel when a lock is activated, a first angle sensor that detects a rotation angle of the steering device, a second angle sensor that detects a steering angle of the steered wheel, and a control device that controls the vehicle state including the operation states of the first and second lock devices on the basis of a state of an ignition switch and an angular difference between the rotation angle and the steering angle. When the ignition switch is turned off, the control device causes the first and second lock devices to operate locking and then turns off a power source of the vehicle, and when the ignition switch is turned on, the control device obtains the angular difference by turning on the power source, and when the angular difference is equal to or less than a predetermined value, executes normal start processing by releasing the lock of the first and second lock device, and when the angular difference exceeds the predetermined value, executes fail-safe processing with which a vehicle function is limited.

REFERENCE DOCUMENT LIST

Patent Document

Patent Document 1: JP 2019-098810 A

SUMMARY OF THE INVENTION

Problem to be Solved by the Invention

In a steer-by-wire system, when the starting switch of a vehicle such as an ignition switch is switched to an OFF state, when the power supply of a steering reaction force actuator such as a reaction force motor is turned off, the steering wheel freely rotates by its own weight depending on the position, and when the starting switch of the vehicle is turned on next time, there is a problem in that a shift is caused between the steering amount of the steering wheel and the steering angle of the steered wheel (hereinafter referred to as a phase shift), and traveling of the vehicle is limited until the shift is corrected.

Moreover, when the power supply of the steering reaction force actuator is turned off, there is a problem in that absence of steering reaction force may give the driver an uncomfortable sensation.

The present invention has been made in view of the conventional situation. An object of the present invention is to provide a steering input device for steer-by-wire that enables suppression of an uncomfortable sensation of a driver at the time of steering while suppressing occurrence of a phase shift between a steering wheel and a steered wheel when the starting switch of the vehicle is switched to an OFF state.

Means for Solving the Problem

According to one aspect of the present invention, a steering input device for steer-by-wire is configured such that after a starting switch of a vehicle is switched to an OFF state, a reaction force motor increases the reaction torque against the steering operation by the driver, and after the reaction torque is increased, a lock mechanism for regulating rotation of the steering shaft is switched from an unlocked state to a locked state.

Effects of the Invention

According to the present invention, it is possible to suppress an uncomfortable feeling of the driver at the time of steering, while suppressing occurrence of a phase shift between a steering wheel and a steered wheel when the starting switch of the vehicle is switched to an OFF state.

MODE FOR CARRYING OUT THE INVENTION

Hereinafter, an embodiment of a steering input device for steer-by-wire according to the present invention will be described based on the drawings.

Figure 1:
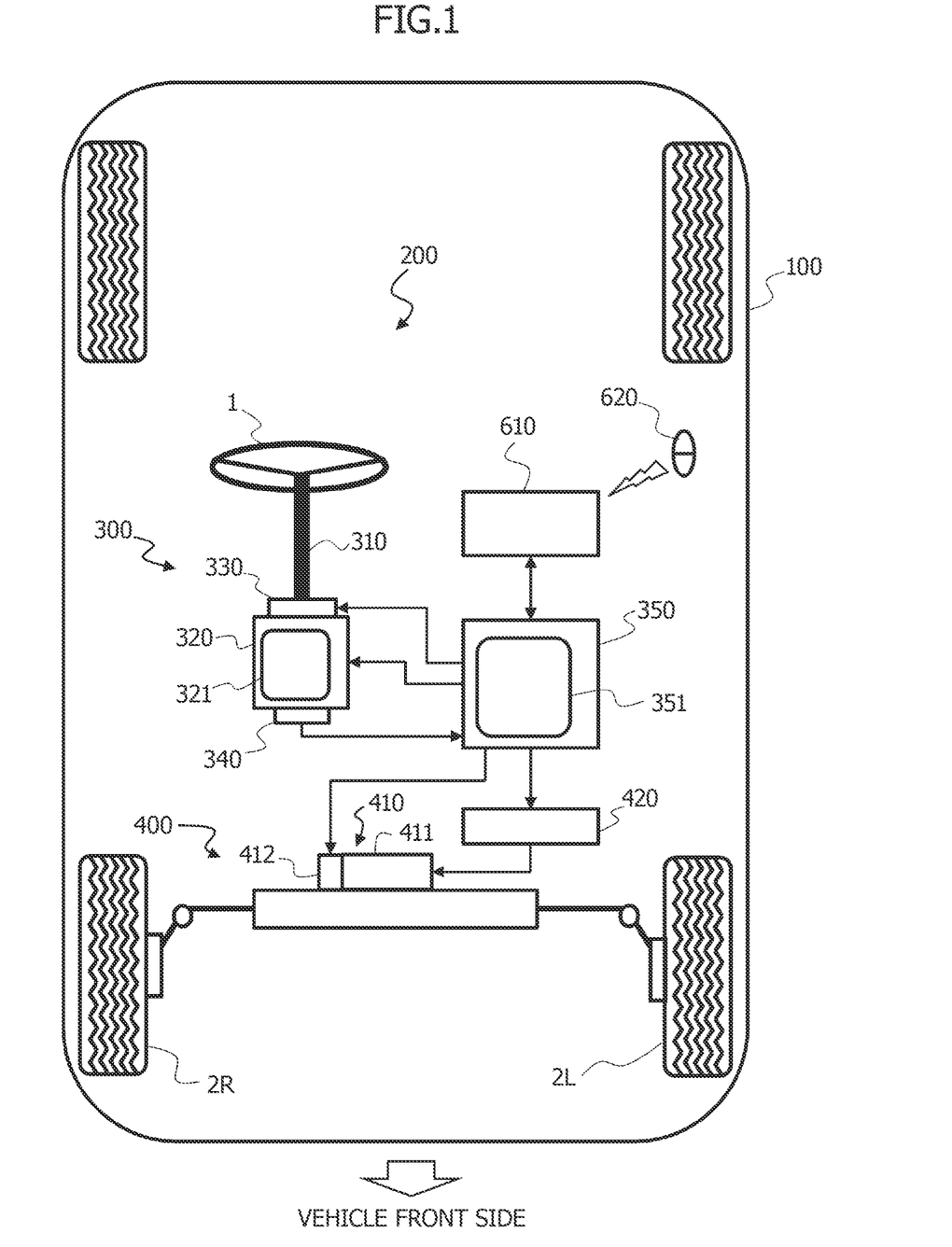
FIG. 1 is a configuration diagram of a steer-by-wire steering system.

FIG. 1 is a configuration diagram illustrating one aspect of a steer-by-wire steering system 200 provided to a vehicle 100 such as an automobile.

A steer-by-wire steering system 200 is a steering system configured such that a steering wheel 1 and steered wheels 2L and 2R (for example, front wheels) are mechanically separated, including a steering input device 300 and a steering actuator device 400.

Steering actuator device 400 includes a steering actuator 410 that applies a steering force to steered wheels 2L and 2R, and an actuator control device 420 as an actuator drive circuit. Steering actuator 410 includes a steering motor 411 that generates a steering force (in other words, an electric motor for steering), and a steered wheel lock mechanism 412 for regulating steering of steered wheels 2L and 2R.

Actuator control device 420 acquires an operation amount signal MS (in other words, steering angle command signal) that is an electrical signal related to the operation amount of steering wheel 1 from steering input device 300, and drives and controls steering motor 411 on the basis of acquired operation amount signal MS to generate a steering force, to thereby steer steered wheels 2L and 2R.

Steered wheel lock mechanism 412 is switched between a locked state of regulating steering of steered wheels 2L and 2R (in other words, fixing the steering angles of steered wheels 2L and 2R) and an unlocked state of allowing steering of steered wheels 2L and 2R (in other words, allowing the steering angles of steered wheels 2L and 2R to be changed), according to a steered wheel lock control signal TLCS from a controller 350 provided to steering input device 300.

In steering actuator device 400, rotation of steering motor 411 is converted into a linear motion by a ball screw or the like, whereby a steering rod 110 moves in a left and right direction of a vehicle 100. When steering rod 110 moves left and right, steered wheels 2L and 2R are steered by the link mechanism.

Then, steered wheel lock mechanism 412 regulates rotation of the output shaft of steering motor 411 and left and right movement of steering rod 110 to thereby regulate steering (in other words, a change in the steering angle) of steered wheels 2L and 2R.

Steering input device 300 includes a steering shaft 310, a steering reaction force actuator 320, a steering shaft lock mechanism 330, a steering amount sensor 340, and controller 350.

Steering shaft 310 is provided to be rotatable along with rotation of steering wheel 1, and is mechanically separated from steered wheels 2L and 2R.

Steering reaction force actuator 320 is a device that applies, to steering shaft 310 (steering wheel 1), a steering load (steering reaction force) by using a reaction force motor 321 such as a brushless DC motor. Steering reaction force actuator 320 includes a torque damper, a steering angle control mechanism, a reduction gear, and the like (not shown) in addition to reaction force motor 321.

Steering shaft lock mechanism 330 is a mechanism for regulating rotation of steering shaft 310, and switches the state between a locked state of regulating rotation of steering shaft 310 (in other words, fixing the angle of steering shaft 310) and an unlocked state of allowing rotation of steering shaft 310 (in other words, allowing the angle of steering shaft 310 to be changed), according to a steering shaft lock control signal SLCS from controller 350.

Controller 350 is an electronic control device mainly configured of a microcomputer 351 including a microprocessor unit (MPU), a read only memory (ROM), and a random access memory (RAM), and cooperatively controls steering actuator 410 and steering reaction force actuator 320 in accordance with a control application program.

In steer-by-wire steering system 200, steering wheel 1 is rotated by a differential torque between a steering torque generated when a driver operates to steer steering wheel 1 and steering reaction force generated by steering reaction force actuator 320.

Then, the rotation angle of steering shaft 310 (in other words, steering angle) by the steering operation is detected by steering amount sensor 340 that is an angle sensor, and is transmitted as operation amount signal MS to steering actuator device 400, and steering actuator device 400 performs position control using steering actuator 410 according to operation amount signal MS.

Controller 350 computes a target steering reaction force (in other words, target steering load) on the basis of position information and the like of steering actuator 410, performs torque control of reaction force motor 321 on the basis of the computed target steering reaction force, and furthermore, for steering shaft lock mechanism 330 and steered wheel lock mechanism 412, controls switching between a locked state and an unlocked state.

Next, structures of steering shaft lock mechanism 330 and steered wheel lock mechanism 412 will be described.

As steering shaft lock mechanism 330, a lock mechanism of a pin engagement type or a brake type is adoptable for example.

Figure 2:
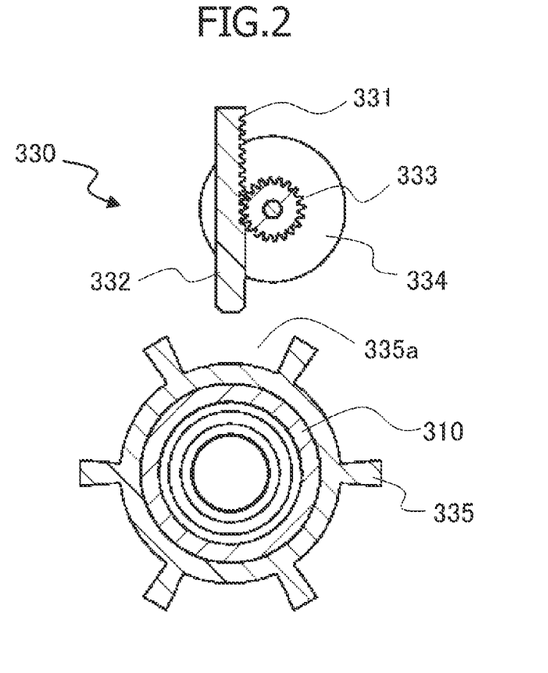
FIG. 2 illustrates an unlocked state of a steering shaft lock mechanism.
Figure 3:
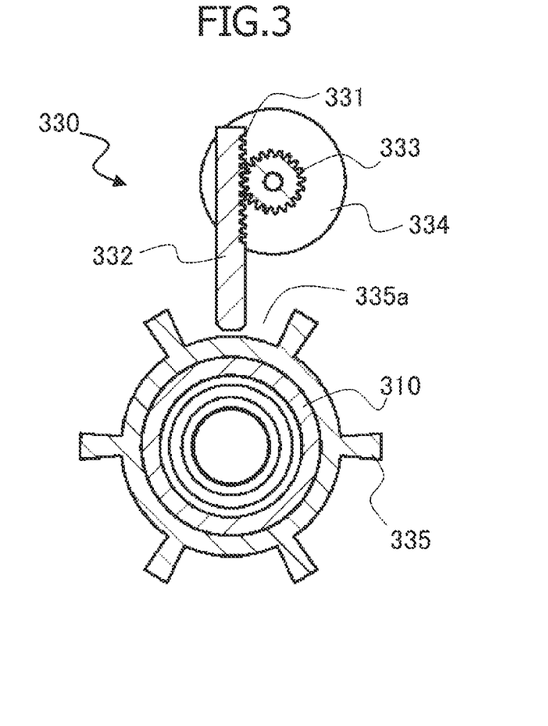
FIG. 3 illustrates a locked state of a steering shaft lock mechanism.

FIGS. 2 and 3 illustrate one aspect of steering shaft lock mechanism 330 of a pin engagement type. FIG. 2 illustrates an unlocked state, and FIG. 3 illustrates a locked state.

Steering shaft lock mechanism 330 illustrated in FIGS. 2 and 3 includes a movable pin 332 on which a rack gear 331 is formed, a pinion gear 333 to be engaged with rack gear 331, a motor 334 that rotatably drives pinion gear 333, and a stopper gear 335 provided to the outer periphery of steering shaft 310.

Rack gear 331 and pinion gear 333 convert the rotation force of the output shaft of motor 334 into a linear motion of movable pin 332, and movable pin 332 is supported movably in the axial direction that is the radial direction of steering shaft 310.

When movable pin 332 is at a retracted position where it does not engage with stopper gear 335 as illustrated in FIG. 2, movable pin 332 is in an unlocked state not regulating the rotation of steering shaft 310.

From the unlocked state, when motor 334 is driven to rotate in a direction that movable pin 332 approaches steering shaft 310 and the distal end of movable pin 332 is in an insertion groove 335a interposed between teeth of stopper gear 335 as illustrated in FIG. 3, a side surface of the distal end portion of movable pin 332 and the teeth of stopper gear 335 contact with each other with respect to the rotation of steering shaft 310, and the state becomes a locked state in which rotation of steering shaft 310 is regulated.

In the case of brake-type steering shaft lock mechanism 330, for example, steering shaft lock mechanism 330 may have a mechanism in which a locked state regulating the rotation of steering shaft 310 is realized by allowing brake pads to be pressed against the outer peripheral surface of steering shaft 310 by the pin in a linear motion by the rotation of the motor.

Steered wheel lock mechanism 412 may also be a pin engagement type lock mechanism as illustrated in FIGS. 2 and 3 or a brake-type lock mechanism, and furthermore, as one aspect of brake type, a structure for regulating steering of steered wheels 2L and 2R by using a clutch mechanism.

Figure 4:
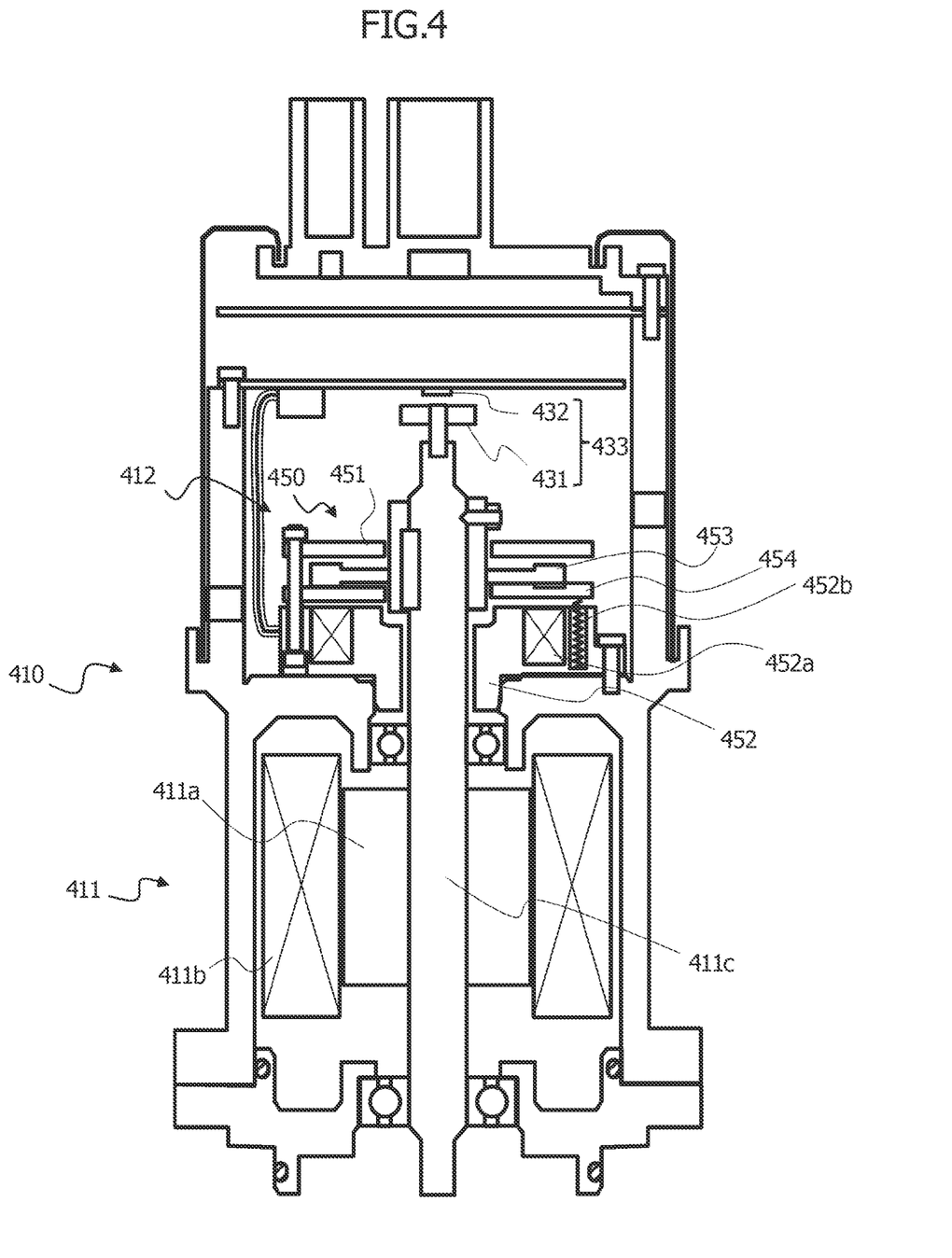
FIG. 4 is a cross-sectional view of a steered wheel lock mechanism.

FIG. 4 illustrates a structure in which steering actuator 410 integrally includes steering motor 411 and steered wheel lock mechanism 412 using a clutch mechanism, as one aspect of steered wheel lock mechanism 412.

Note that the clutch mechanism illustrated in FIG. 4 is used as steered wheel lock mechanism 412 and is also used as an electromagnetic brake for braking to stop steering motor 411.

In steering actuator 410 of FIG. 4, steering motor 411 includes a rotor 411a, a stator coil 411b, and an output shaft 411c, and steered wheel lock mechanism 412 includes a clutch mechanism 450.

A combination of a magnet 431 provided at an end portion of output shaft 411c and a magnetic sensor element 432 arranged to face magnet 431 constitutes a motor angle sensor 433 that detects a rotation angle of output shaft 411c.

Clutch mechanism 450 includes a plate 451, a fixed part including a stator 452, a rotor 453, and a movable part including an armature 454. Rotor 453 and armature 454 are movable in the axial direction of output shaft 411c, and are provided so as to be rotatable integrally with output shaft 411c.

Stator 452 includes a coil 452a and a torque spring 452b.

In an OFF state in which power supply to coil 452a is interrupted, torque spring 452b presses armature 454 and rotor 453 toward plate 451 whereby rotor 453 closely contacts plate 451, so that a clutch engagement state in which rotation of rotor 453 and output shaft 411c is regulated is realized. As a result, a locked state in which steering of steered wheels 2L and 2R is regulated is realized.

On the other hand, in an ON state in which power is supplied to coil 452a, since armature 454 is drawn to stator 452 against the energizing force of torque spring 452b, rotor 453 is released from plate 451 to be rotatable (in other words, in a clutch released state). As a result, rotation of output shaft 411c is allowed so at to be in an unlocked state in which steering of steered wheels 2L and 2R is allowed.

In addition, in the case in which reaction force motor 321 is a brushless DC motor, a motor rotation angle sensor to be used for controlling driving of reaction force motor 321 is provided, and furthermore, steering amount sensor 340 for detecting the operation amount of steering wheel 1 by the driver can be provided separately from the motor rotation angle sensor.

However, in the case of a system in which a motor rotation angle sensor is also used as steering amount sensor 340 and the operation amount of steering wheel 1 by the driver is detected by using an output signal from the motor rotation angle sensor as operation amount signal MS, it is possible to omit a dedicated steering amount sensor so as to prevent steer-by-wire steering system 200 from being increased in size and being complicated.

Figure 5:
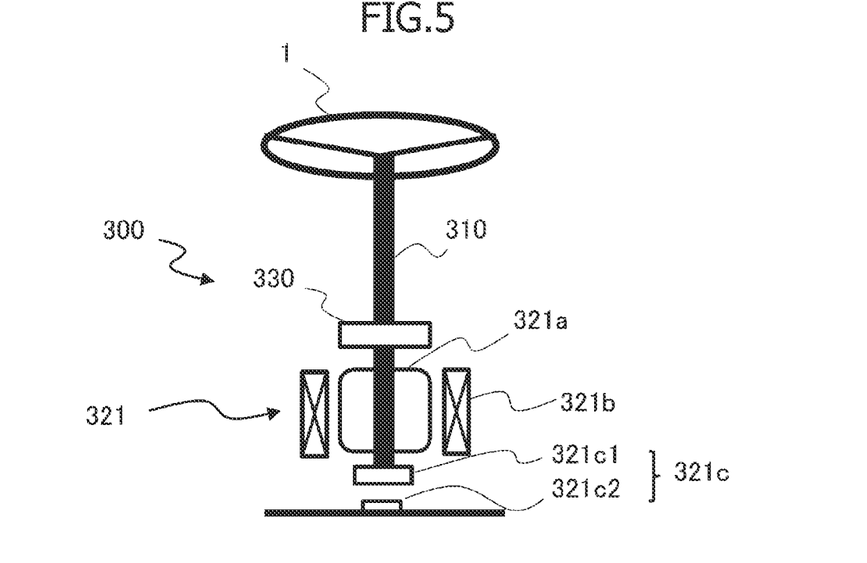
FIG. 5 is a schematic configuration diagram of a steering reaction force actuator.

FIG. 5 is a schematic configuration diagram of steering reaction force actuator 320 including a motor rotation angle sensor.

Reaction force motor 321 that is a brushless DC motor includes a rotor 321a, a stator coil 321b, and a motor rotation angle sensor 321c that detects rotation angle of rotor 321a.

Motor rotation angle sensor 321c that is also an angle sensor includes, for example, a magnet 321c1 that rotates integrally with rotor 321a, and a magnetic sensor element 321c2 that detects a magnetic field change by magnet 321c1 and outputs it as an analog signal.

Here, controller 350 controls driving of reaction force motor 321 on the basis of the output of motor rotation angle sensor 321c, and steering actuator device 400 acquires the output signal of motor rotation angle sensor 321c as operation amount signal MS (in other words, using motor rotation angle sensor 321c as steering amount sensor 340) and controls steering actuator 410.

In addition to normal steering reaction control, controller 350 performs control to increase a steering reaction force than in a normal state when the starting switch of vehicle 100 is switched from an ON state to an OFF state, and when switched from an OFF state to an ON state.

Hereinafter, a control function of the steering reaction force will be described in detail.

Figure 6:
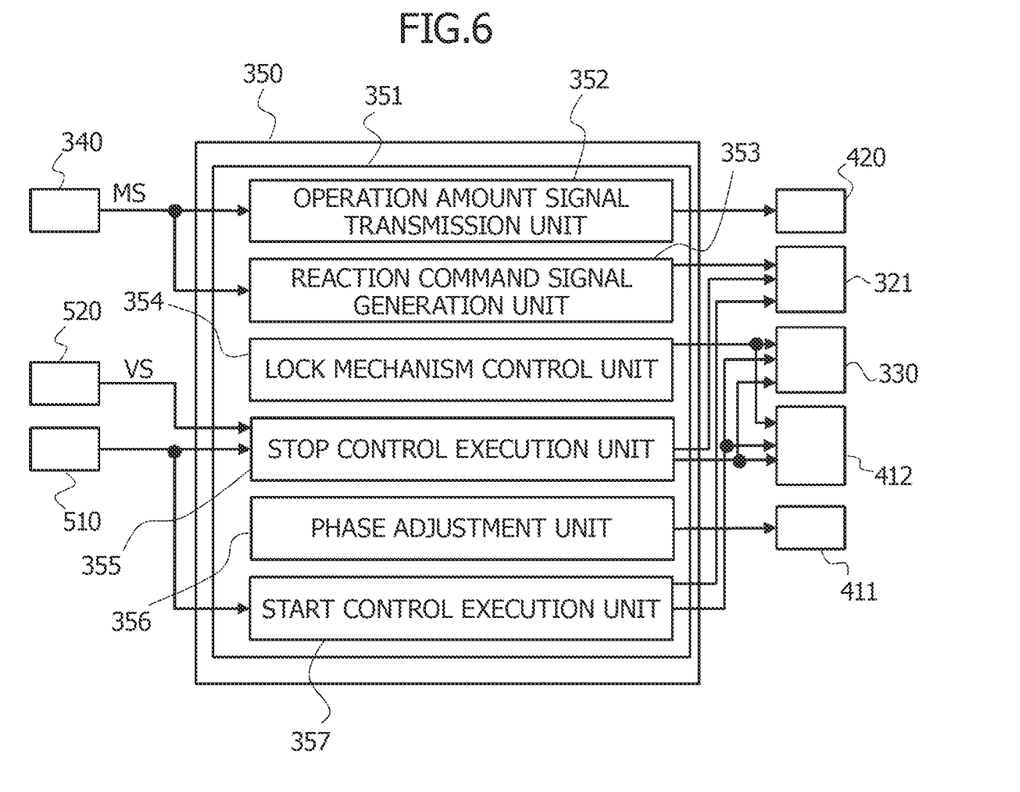
FIG. 6 is a functional block diagram of a controller.

FIG. 6 is a functional block diagram of controller 350.

Microcomputer 351 of controller 350 includes functions as an operation amount signal transmission unit 352, a reaction command signal generation unit 353, a lock mechanism control unit 354, a stop control execution unit 355, a phase adjustment unit 356, and a start control execution unit 357, as software.

Operation amount signal transmission unit 352 transmits operation amount signal MS of steering amount sensor 340 to actuator control device 420 of steering actuator device 400.

Reaction command signal generation unit 353 generates a reaction command signal (in other words, a reaction force motor drive signal) that is a signal for controlling driving of reaction force motor 321 on the basis of operation amount signal MS and the like, and outputs the generated reaction command signal to reaction force motor 321.

Reaction force motor 321 applies, to steering shaft 310, a reaction torque against the steering operation by the driver in response to the reaction command signal.

Lock mechanism control unit 354 switches the states of steering shaft lock mechanism 330 and steered wheel lock mechanism 412 between a locked state and an unlocked state.

Stop control execution unit 355 executes stop control to increase the reaction torque (in other words, holding torque or friction torque) generated by reaction force motor 321 after starting switch 510 of vehicle 100 is switched from an ON state to an OFF state, and after the reaction torque is increased, switches steering shaft lock mechanism 330 from an unlocked state to a locked state, and furthermore, after steering shaft lock mechanism 330 is switched to a locked state, switches steered wheel lock mechanism 412 from an unlocked state to a locked state.

Note that starting switch 510 includes an ignition switch, an accessory switch, or a starting switch for a hybrid vehicle or an electric vehicle.

Phase adjustment unit 356 controls steering motor 411 of steering actuator device 400 on the basis of operation amount signal MS so as to decrease the phase shift between steering wheel 1 and steered wheels 2L and 2R.

After starting switch 510 is switched to an ON state, start control execution unit 357 increases the reaction torque, and then, decreases the reaction torque after steering shaft lock mechanism 330 is switched from a locked state to an unlocked state.

Figure 7:
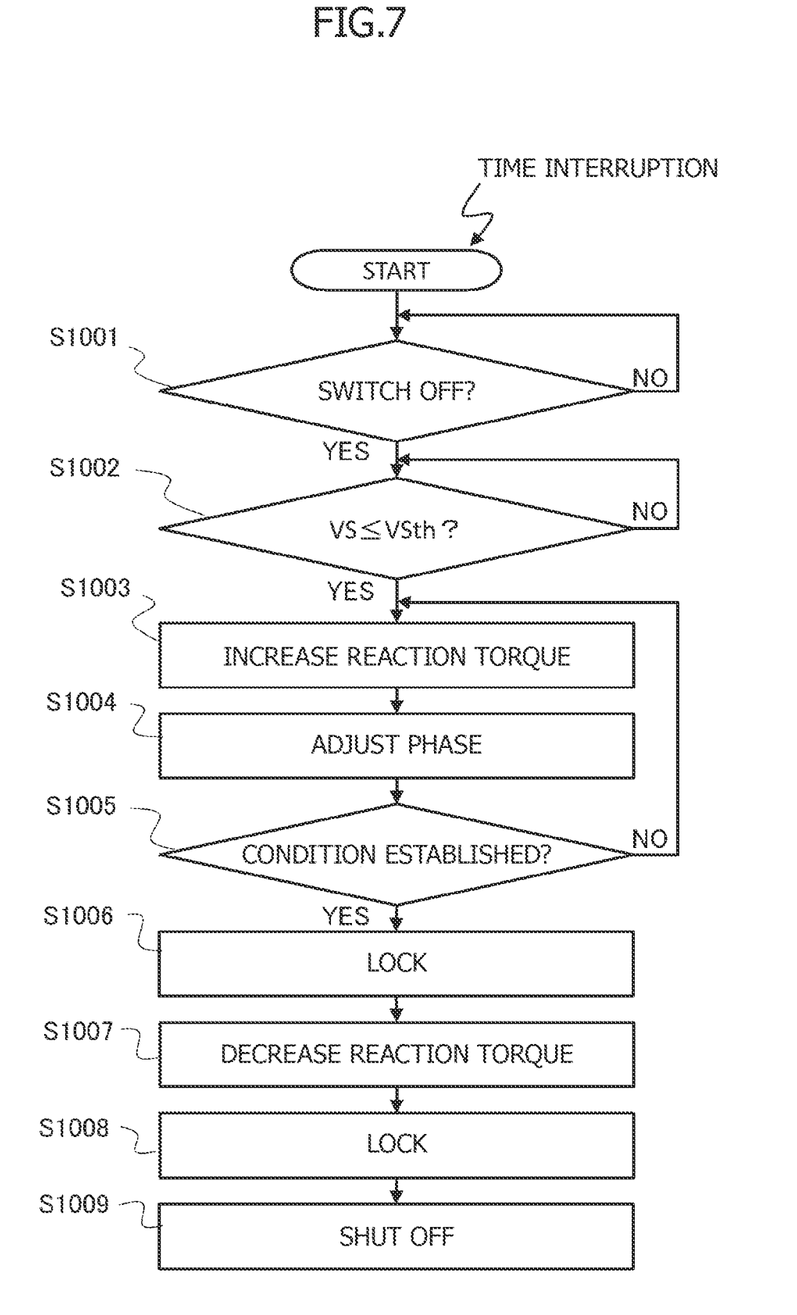
FIG. 7 is a flowchart illustrating a processing procedure of stop control.

FIG. 7 is a flowchart illustrating a processing procedure of controller 350 (stop control execution unit 355) when starting switch 510 is switched from an ON state to an OFF state.

Note that controller 350 and actuator control device 420 each have a self-shut-off function in which power supply is continued until predetermined processing ends even after starting switch 510 is switched to an OFF state, and after the predetermined processing ends, power supply is shut off by itself.

At step S1001, controller 350 first determines whether or not starting switch 510 is switched from an ON state to an OFF state by the driver of vehicle 100.

Then, when starting switch 510 is switched to an OFF state, controller 350 proceeds to step S1002, and determines whether or not the speed [km/h] (hereinafter referred to as a vehicle speed VS) of vehicle 100, detected by a speed sensor 520, is equal to or less than a predetermined value VSth.

Here, a state in which vehicle speed VS is equal to or less than predetermined value VSth is a state in which vehicle 100 is almost stopped and a condition in which it is estimated that steering is unnecessary.

After starting switch 510 is switched to an OFF state, when vehicle 100 travels downslope or the like by inertia, and vehicle speed VS exceeds predetermined value VSth, it is necessary to control the traveling locus of vehicle 100 by the operation (steering operation) of steering wheel 1 by the driver.

In the condition of such inertia traveling, since increasing the reaction torque with respect to the steering operation or operating steering shaft lock mechanism 330 and steered wheel lock mechanism 412 by stop control execution unit 355 disturb the steering operation of the driver, it is unfavorable for safe travel of vehicle 100.

Therefore, when vehicle speed VS exceeds predetermined value VSth, controller 350 does not perform stop control by stop control execution unit 355, that is, there is no increase in reaction torque and lock operation is not performed, and allows the driver to perform normal steering operation continuously to thereby improve the traveling safety of vehicle 100.

Note that when stop control execution unit 355 performs stop control according to vehicle speed VS as described above, even after starting switch 510 is switched to an OFF state, the system allows controller 350 to continuously acquire a vehicle speed signal from speed sensor 520.

In addition, when vehicle speed VS is equal to or less than predetermined value VSth and vehicle 100 is almost stopped, the necessity of steering operation by the driver is sufficiently small, and stop control by stop control execution unit 355 can be performed.

Therefore, when vehicle speed VS is equal to or less than predetermined value VSth, controller 350 proceeds to step S1003, and after, performs stop control of steering input device 300 by stop control execution unit 355.

At step 1003, controller 350 increases the reaction torque (in other words, holding torque or friction torque) generated by reaction force motor 321, and brings about a condition in which the driver cannot easily rotate steering wheel 1.

This means that since starting switch 510 is switched to an OFF state, controller 350 finally allows steering shaft lock mechanism 330 to operate to lock steering shaft 310 and also steering wheel 1. However, immediately after starting switch 510 is switched to an OFF state, controller 350 does not cause steering shaft lock mechanism 330 to be in a locked state, and after a period of time in which the reaction torque is increased than in a normal state, controller 350 allows steering shaft lock mechanism 330 to operate.

According to such a configuration, even if the driver switches starting switch 510 to an OFF state, steering wheel 1 is not locked immediately, so that it is possible to suppress an uncomfortable sensation in steering of the driver.

Furthermore, since the reaction torque is increased after starting switch 510 is switched to an OFF state, easy rotation of steering wheel 1 is suppressed, so that a shift in the phase relationship between steering wheel 1 and steered wheels 2L and 2R can be suppressed.

Figure 8:
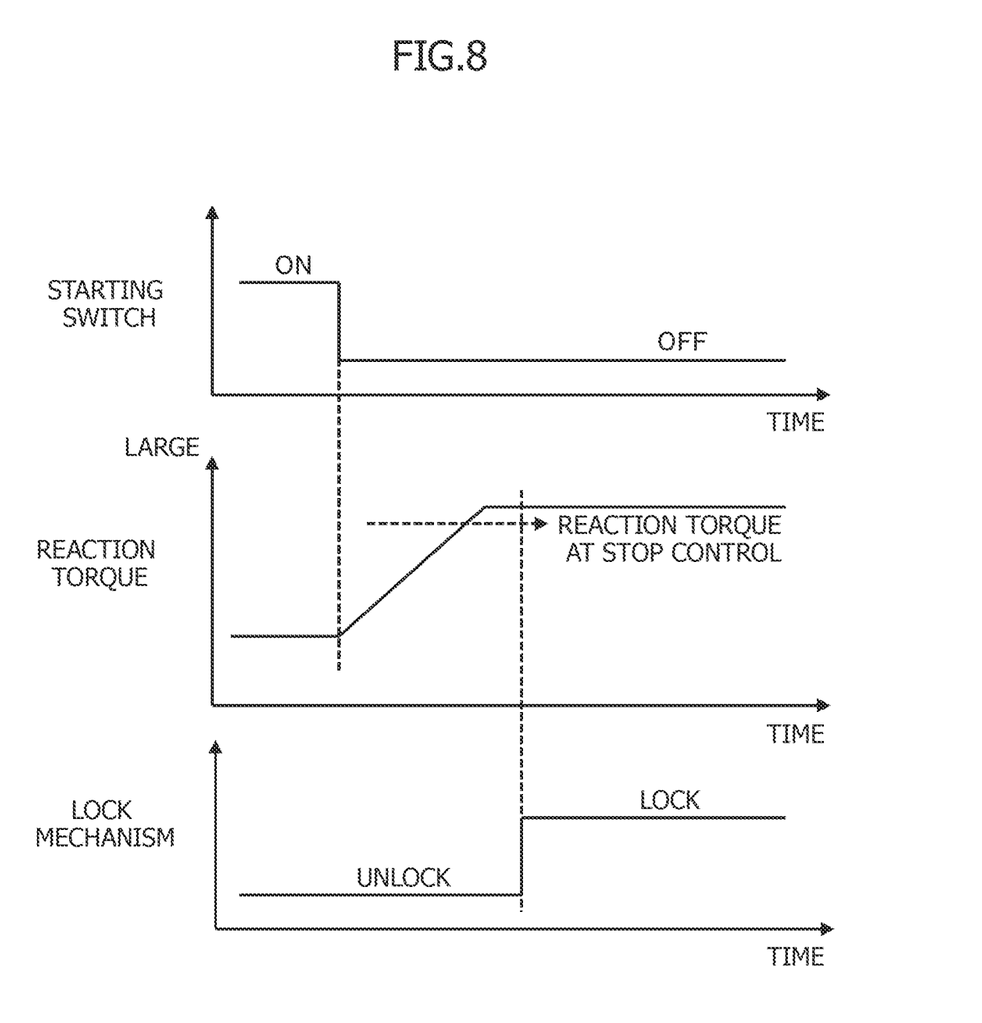
FIG. 8 is a time chart illustrating a change in reaction torque in stop control.

FIG. 8 illustrates one aspect of a change of increase in a reaction torque by the processing at step S1003.

At step S1003, when controller 350 increases a reaction torque generated by reaction force motor 321, controller 350 gradually increases the reaction torque.

Thereby, even in the case in which the driver keeps holding steering wheel 1 after starting switch 510 is switched to an OFF state, the reaction torque is not increased suddenly, but is instead increased gradually. Therefore, an uncomfortable sensation in steering for the driver can be reduced as much as possible.

Furthermore, on the basis of off-operation of starting switch 510, when increasing the reaction torque at step S1003, controller 350 increases the reaction torque without allowing it to be less than the reaction torque corresponding to a reaction command signal (in other words, normal reaction torque) generated by reaction command signal generation unit 353, that is, by using the normal reaction torque corresponding to the reaction command signal generated by reaction command signal generation unit 353 as an initial value.

According to such a configuration, when starting switch 510 is switched to an OFF state, it is possible to prevent the feeling of operation that the reaction torque is temporarily released, and furthermore, it is possible to suppress a shift in the phase relationship between steering wheel 1 and steered wheels 2L and 2R.

Furthermore, when increasing the reaction torque at step S1003, controller 350 increases the reaction torque to be equal to or greater than the reaction torque at the time of stop control that is a predetermined reaction torque (in other words, predetermined target reaction torque), and in the state in which the reaction torque is equal to or greater than the reaction torque at the time of stop control, controller 350 allows steering shaft lock mechanism 330 to operate to lock steering shaft 310 and also steering wheel 1.

Here, the reaction torque at the time of stop control is a reaction torque with which a typical driver cannot easily rotate steering wheel 1.

With such a configuration, it is possible to suppress a shift in the phase relationship between steering wheel 1 and steered wheels 2L and 2R.

Note that in the processing of increasing the reaction torque, an upper limit reaction torque that is set to be equal to or greater than the reaction torque at the time of stop control, and after the reaction torque reaches the upper limit reaction torque, controller 350 can maintain the reaction torque at the upper limit reaction torque.

At the next step S1004, controller 350 controls steering actuator device 400 by phase adjustment unit 356 on the basis of operation amount signal MS so as to prevent the phase shift between steering wheel 1 and steered wheels 2L and 2R from being increased.

As a result, even after starting switch 510 is switched to an OFF state, in a state in which the phase shift between steering wheel 1 and steered wheels 2L and 2R is maintained at a small level, it is possible to allow steering shaft lock mechanism 330 to operate to lock steering shaft 310 and also steering wheel 1.

Therefore, when vehicle 100 is restarted, vehicle 100 can start travelling in a state in which the phase shift between steering wheel 1 and steered wheels 2L and 2R is small.

Here, when phase adjustment unit 356 executes phase adjustment control to maintain the phase shift between steering wheel 1 and steered wheels 2L and 2R at a small level, phase adjustment unit 356 controls driving of steering actuator 410 such that the steering angular velocity (in other words, speed of change of steering angle) of steered wheels 2L and 2R does not exceed a predetermined value (in other words, upper speed limit).

Thereby, it is possible to prevent generation of noise such as friction sound between a tire and a road surface and rolling of vehicle 100 that are caused by sudden steering of steered wheels 2L and 2R along with the phase adjustment control.

Note that with a configuration that after starting switch 510 of vehicle 100 is switched to an OFF state and during control to increase the reaction torque (in other words, during an increase in the reaction torque), operation amount signal transmission unit 352 transmits operation amount signal MS to steering actuator device 400 when steering operation is performed, it is possible to allow steering actuator device 400 to perform control to maintain a phase shift between steering wheel 1 and steered wheels 2L and 2R at a small level.

Even in that case, it is possible to lock steering shaft 310 in a state of maintaining the phase shift between steering wheel 1 and steered wheels 2L and 2R at a small level, and when vehicle 100 is restarted, vehicle 100 can start traveling in a state in which a phase shift between steering wheel 1 and steered wheels 2L and 2R is small.

Then, controller 350 proceeds to step S1005, and determines whether or not an elapsed time ET from the time when the reaction torque begins to increase reaches a predetermined time Tth, that is, whether or not a condition for switching steering shaft lock mechanism 330 from an unlocked state to a locked state is established.

The predetermined time Tth is set to a period of time in which at least a reaction torque has become the reaction torque at the time of stop control or greater.

Then, when the elapsed time ET is less than predetermined time Tth, controller 350 returns to step S1003 and continues controlling to increase the reaction torque.

In addition, when elapsed time ET is equal to or greater than predetermined time Tth, controller 350 determines that a condition for switching steering shaft lock mechanism 330 from an unlocked state to a locked state is established, and proceeds to step S1006 and switches steering shaft lock mechanism 330 from an unlocked state to a locked state.

This means that controller 350 switches steering shaft lock mechanism 330 to a locked state after a predetermined time has elapsed from the time when the reaction torque begins to increase.

As described above, with a configuration of determining the timing of switching steering shaft lock mechanism 330 from an unlocked state to a locked state on the basis of time measurement by a timer, control by controller 350 can be performed easily.

Note that controller 350 determines whether or not a driver performs a steering operation on the basis of operation amount signal MS at step S1005, instead of switching steering shaft lock mechanism 330 to a locked state on the basis of time measurement by a timer, and when determining that there is no steering operation by the driver, controller 350 proceeds to step S1006 and can switch steering shaft lock mechanism 330 from an unlocked state to a locked state.

With this configuration, even after starting switch 510 is switched to an OFF state, since steering shaft lock mechanism 330 is not switched to a locked state during the steering operation by the driver, an uncomfortable sensation in steering by the driver can be reduced.

Moreover, at step S1005, controller 350 determines whether or not the door of vehicle 100 is switched from an unlocked state to a locked state, that is, whether or not the door of vehicle 100 is locked, and when the door is locked, controller 350 proceeds to step S1006 and can switch steering shaft lock mechanism 330 from an unlocked state to a locked state.

Note that controller 350 acquires information about door lock/release from a body control module (BCM) 610 that controls door lock of vehicle 100.

A door lock system in which BCM 610 controls door lock by receiving an operation signal to lock or unlock a door from a remote controller 620 (remote controller key) for locking and unlocking the door lock via wireless communication is publicly known.

In the case in which such a door lock system is adopted, at step S1005, controller 350 determines whether or not remote controller 620 is separated from vehicle 100 by a predetermined distance (in other words, whether or not it is out of working range), and when remote controller 620 is separated from vehicle 100 by a predetermined distance, controller 350 proceeds to step S1006 and can switch steering shaft lock mechanism 330 from an unlocked state to a locked state.

A state in which the door of vehicle 100 is locked or a state in which remote controller 620 is separated from vehicle 100 by a predetermined distance is a state in which it is presumed that a driver is not seated on the driver's seat of vehicle 100 and is not holding steering wheel 1.

Therefore, even though controller 350 switches steering shaft lock mechanism 330 from an unlocked state to a locked state on the basis of the condition described above, an uncomfortable sensation in steering of the driver will never be caused.

After switching steering shaft lock mechanism 330 from an unlocked state to a locked state at step S1006, controller 350 proceeds to step S1007, and decreases the reaction torque generated by reaction force motor 321 to be a value smaller than the reaction torque at the time of stop control.

After steering shaft lock mechanism 330 is switched to a locked state and steering shaft 310 is mechanically locked, since there is no need to generate a reaction torque, it is possible to reduce power consumption of reaction force motor 321 by decreasing the reaction torque generated by reaction force motor 321.

Note that processing to decrease the reaction torque generated by reaction force motor 321 to a value smaller than the reaction torque at the time of stop control includes processing to shut off power supply to reaction force motor 321.

Then, controller 350 proceeds to step S1008, switches steered wheel lock mechanism 412 from an unlocked state to a locked state, and allows steered wheel lock mechanism 412 to operate so as to regulate steering of steered wheels 2L and 2R, in other words, to mechanically lock the steering angles of steered wheels 2L and 2R.

That is, after controller 350 switches steering shaft lock mechanism 330 from an unlocked state to a locked state, controller 350 switches steered wheel lock mechanism 412 from an unlocked state to a locked state.

In an unlocked state of steering shaft lock mechanism 330, it is necessary to change the steering angles of steered wheels 2L and 2R along with the steering operation of steering wheel 1 by the driver.

Accordingly, by switching steered wheel lock mechanism 412 to a locked state after switching steering shaft lock mechanism 330 to a locked state, when a steering operation of steering wheel 1 is performed, it is possible to allow the steering angles of steered wheels 2L to 2R to follow the steering operation.

After switching steering shaft lock mechanism 330 to a locked state, controller 350 continues phase adjustment control to allow the steering angles of steered wheels 2L and 2R to follow the steering operation, and when the phase shift becomes a predetermined value or smaller, controller 350 can switch steered wheel lock mechanism 412 to a locked state.

After switching steering shaft lock mechanism 330 from an unlocked state to a locked state, when switching steered wheel lock mechanism 412 from an unlocked state to a locked state, controller 350 proceeds to step S1009 and cuts off power supply to steering input device 300 and steering actuator device 400.

The reaction torque when starting switch 510 of vehicle 100 is switched from an ON state to an OFF state and control of lock mechanisms 330 and 412, performed by stop control execution unit 355 of controller 350, have been described above.

Furthermore, controller 350 includes, as software, a function of start control execution unit 357 that controls the reaction torque and lock mechanisms 330 and 412 when starting switch 510 of vehicle 100 is switched from an OFF state to an ON state.

Figure 9:
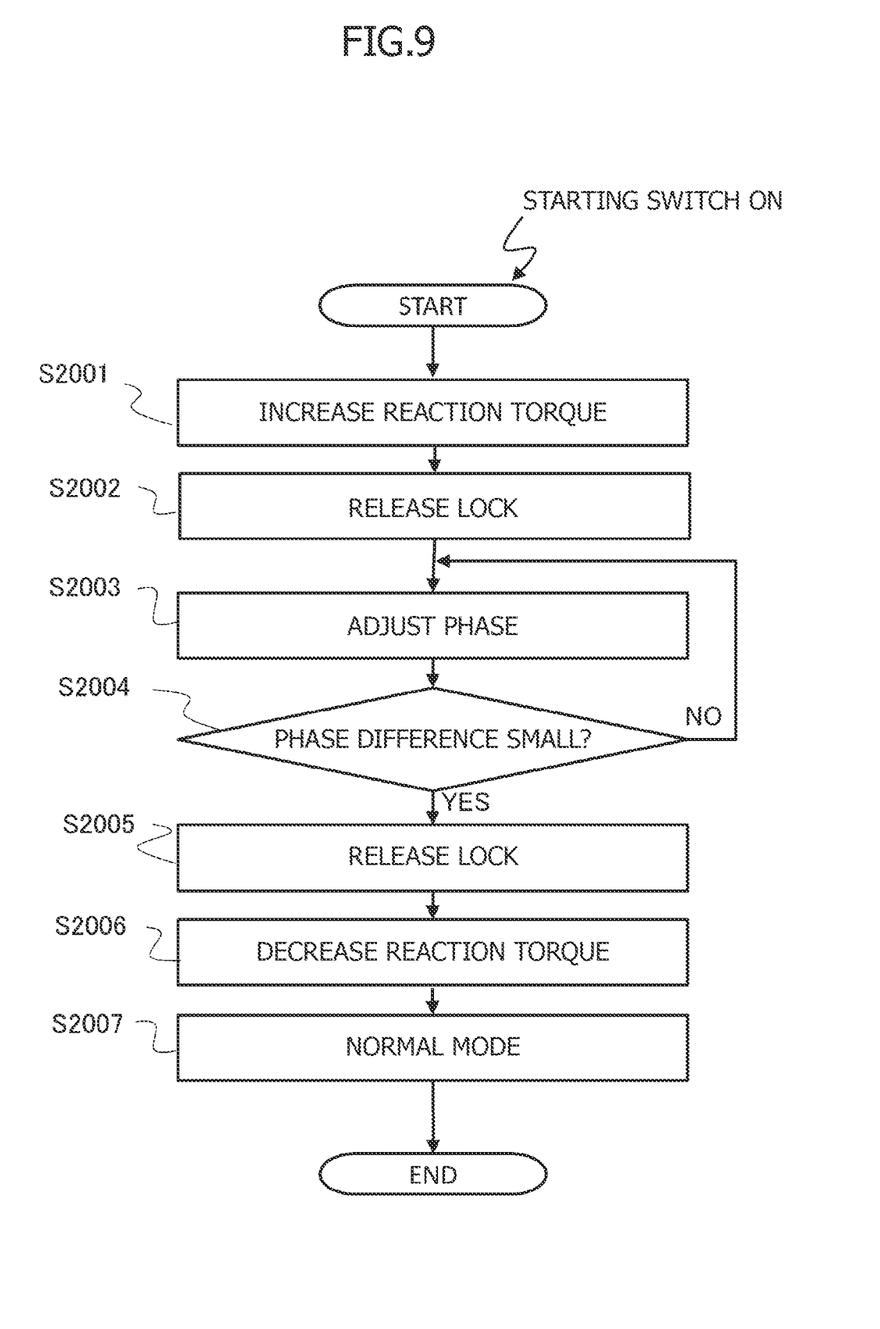
FIG. 9 is a flowchart illustrating a processing procedure of start control.

The flowchart of FIG. 9 is a flowchart illustrating a processing procedure of controller 350 (start control execution unit 357) when starting switch 510 is switched from an OFF state to an ON state.

When starting switch 510 is switched from the OFF state to the ON state and is activated, at step S2001, controller 350 increases the reaction torque generated by reaction force motor 321 to be a reaction torque at the time of start control (in other words, target reaction torque at the time of start control) or greater.

Here, the reaction torque at the time of start control is a predetermined reaction torque that is greater than a normal reaction torque, and can be similar to a reaction torque at the time of stop control.

Note that controller 350 may be configured to be started on the basis of releasing of door lock of vehicle 100 for example. In that case, controller 350 that is started on the basis of releasing of door lock can perform the processing procedure illustrated in the flowchart of FIG. 9.

Then, controller 350 proceeds to step S2002, switches steered wheel lock mechanism 412 from a locked state to an unlocked state, and releases the locked state of steered wheels 2L and 2R.

Note that since steering actuator device 400 controls the steering angles of steered wheels 2L and 2R according to operation amount signal MS, at step S2002, even if steered wheel lock mechanism 412 is switched to an unlocked state, the steering angles of steered wheels 2L and 2R will not be free.

After controller 350 increases the reaction torque, controller 350 switches steered wheel lock mechanism 412 to an unlocked state, and then proceeds to step S2003 and sets steering actuator device 400 to a steering angle calibration mode.

A steering angle calibration mode is a mode of controlling driving of steering motor 411 so as to decrease the phase shift between steering wheel 1 and steered wheels 2L and 2R, that is, a mode of performing phase adjustment by phase adjustment unit 356.

At that time, since steering shaft lock mechanism 330 is maintained in a locked state, controller 350 controls driving of steering motor 411 so as to match the steering angles of steered wheels 2L and 2R to the lock position of steering shaft 310.

At the next step S2004, controller 350 determines whether or not the phase shift between steering wheel 1 and steered wheels 2L and 2R is equal to or less than a predetermined value.

Then, when the phase shift exceeds the predetermined value, controller 350 returns to step S2003 and continues the steering angle calibration mode to allow the phase shift between steering wheel 1 and steered wheels 2L and 2R to become the predetermined value or less.

When the phase shift between steering wheel 1 and steered wheels 2L and 2R becomes the predetermined value or less by the steering angle calibration mode, controller 350 proceeds to step S2005 and switches steering shaft lock mechanism 330 from a locked state to an unlocked state to release the lock of steering shaft 310 and steering wheel 1 to thereby enable steering operation by the driver.

This means that during the steering angle calibration mode (in other words, during phase adjustment control), steering shaft lock mechanism 330 is maintained in a locked state. Therefore, it is possible to avoid the case in which steering wheel 1 is steered during the steering angle calibration mode and the phase shift between steering wheel 1 and steered wheels 2L and 2R is increased.

Note that controller 350 performs processing to make vehicle 100 unable to travel during the time from when starting switch 510 is switched to an ON state until steering shaft lock mechanism 330 is switched to an unlocked state at step S2005.

The processing to make vehicle 100 unable to travel includes processing of preventing the shift position of the transmission of vehicle 100 from being moved from park (P)e to drive (D) or the like, and processing of not releasing the parking brake of vehicle 100.

In the locked state of steering shaft lock mechanism 330, the driver cannot operate steering wheel 1 and cannot change the steering angles of steered wheels 2L and 2R. Therefore, controller 350 makes vehicle 100 unable to travel to thereby improve the safety of vehicle 100.

After switching steering shaft lock mechanism 330 to an unlocked state at step S2005, controller 350 proceeds to step S2006 and decreases the reaction torque generated by reaction force motor 321, and at the next step S2007, controller 350 moves to normal reaction torque control.

Lock release of steering shaft 310 at step S2005 is performed in a state in which the reaction torque generated by reaction force motor 321 is increased to be more than that in a normal state.

Accordingly, even if steering shaft lock mechanism 330 is switched to an unlocked state under the condition that the driver holds steering wheel 1 by hand, it is possible to suppress an increase in the phase shift between steering wheel 1 and steered wheels 2L and 2R that is caused by a sudden rotation of steering wheel 1.

Then, controller 350 decreases the reaction torque thereafter and moves to a normal reaction torque control state, which enables the driver to perform steering operation in a state in which the phase shift is sufficiently small.

Note that in the case in which steering wheel 1 is steered during the time of decreasing the reaction torque, since steered wheel lock mechanism 412 is in an unlocked state, controller 350 can allow the steering angles of steered wheels 2L and 2R to follow the steering operation of steering wheel 1.

The respective technical concepts described in the embodiment can be used in combination appropriately as long as it does not cause a conflict.

Furthermore, although the content of the present invention has been described specifically with reference to a preferable embodiment, it is obvious to those skilled in the art that various modifications can be adopted on the basis of the basic technical concept and teaching.

For example, steer-by-wire steering system 200 may be a system including a backup mechanism for mechanically coupling steering wheel 1 and steered wheels 2L and 2R via a clutch.

Moreover, steering actuator 410 can also include a sub motor that performs adjustment of the toe angle of steered wheels 2L and 2R, in addition to steering motor 411 that generates a steering force.

Furthermore, controller 350 and actuator control device 420 can be made redundant.

For example, a redundant system may be configured such that reaction force motor 321 and steering motor 411 include two wiring sets, controller 350 and actuator control device 420 include a first microcomputer (first MCU) that controls driving of a first wiring set, and a second microcomputer (second MCU) that controls driving of a second wiring set, and furthermore, steering amount sensor 340 and sensors that detect steering angles (for example, rack position) of steered wheels 2L and 2R are duplicated.

Moreover, a dedicated battery may be provided for each system of the redundant system.

Furthermore, the configuration of steering actuator 410 is not limited to a configuration of generating a steering force by steering motor 411. An actuator that generates a steering force by hydraulic pressure can also be adopted.

Furthermore, in the control of gradually increasing the reaction torque, controller 350 can change the torque change speed in the increasing process. For example, when the phase shift between steering wheel 1 and steered wheels 2L and 2R is increasing, controller 350 can accelerate the speed of gradually by increasing the reaction torque.

REFERENCE SYMBOL LIST

1 Steering wheel
2L, 2R Steered wheel
100 Vehicle
200 Steer-by-wire steering system
300 Steering input device
310 Steering shaft
320 Steering reaction force actuator
321 Reaction force motor
330 Steering shaft lock mechanism
340 Steering amount sensor
350 Controller
352 Operation amount signal transmission unit
353 Reaction command signal generation unit
354 Lock mechanism control unit
355 Stop control execution unit
356 Phase adjustment unit
357 Start control execution unit
400 Steering actuator device
410 Steering actuator
411 Steering motor
412 Steered wheel lock mechanism
420 Actuator control device
510 Starting switch

The invention claimed is:

1. A steering input device for steer-by-wire, the device comprising:
   a steering shaft provided to be rotatable along with rotation of a steering wheel and mechanically separated from a steered wheel;
   a reaction force motor that applies a steering load to the steering shaft;
   a lock mechanism that regulates rotation of the steering shaft;
   a steering amount sensor that detects an operation amount of the steering shaft, and outputs an operation amount signal that is a signal related to the operation amount; and
   a controller including an operation amount signal transmission unit, a reaction command signal generation unit, a lock mechanism control unit, and a stop control execution unit, wherein
   the operation amount signal transmission unit transmits the operation amount signal to a control device of a steering actuator that applies a steering force to the steered wheel,
   the reaction command signal generation unit generates a reaction command signal based on the operation amount signal,
   the reaction command signal is a signal for controlling driving of the reaction force motor such that the reaction force motor generates a reaction torque against a steering operation by a driver,
   the lock mechanism control unit controls switching between a locked state in which the lock mechanism regulates rotation of the steering shaft and an unlocked state in which the lock mechanism allows rotation of the steering shaft, and
   after a starting switch of a vehicle is switched to an OFF state, the stop control execution unit increases the reaction torque, and after the reaction torque is increased, the stop control execution unit switches the lock mechanism from the unlocked state to the locked state.

2. The steering input device for steer-by-wire, according to claim 1, wherein
   the stop control execution unit gradually increases the reaction torque after the starting switch of the vehicle is switched to the OFF state.

3. The steering input device for steer-by-wire, according to claim 1, wherein
   the stop control execution unit switches the lock mechanism to the locked state after a predetermined time has elapsed since the reaction torque began to increase after the starting switch of the vehicle is switched to the OFF state.

4. The steering input device for steer-by-wire, according to claim 1, wherein
   the stop control execution unit switches the lock mechanism to the locked state when the stop control execution unit determines that no steering operation is performed by the driver based on the operation amount signal.

5. The steering input device for steer-by-wire, according to claim 4, wherein
   the reaction force motor includes a rotor and a stator coil,
   the steering amount sensor is a motor rotation angle sensor that detects a rotation angle of the rotor, and
   the stop control execution unit determines whether or not the driver operates the steering, based on an output signal of the motor angle sensor.

6. The steering input device for steer-by-wire, according to claim 1, wherein
   the stop control execution unit increases the reaction torque when a speed of the vehicle is equal to or less than a predetermined value.

7. The steering input device for steer-by-wire, according to claim 1, wherein
   the stop control execution unit increases the reaction torque to be equal to or greater than a reaction torque at a time of stop control that is a predetermined reaction torque, and in a state in which the reaction torque is equal to or greater than the reaction torque at the time of stop control, the stop control execution unit switches the lock mechanism from the unlocked state to the locked state.

8. The steering input device for steer-by-wire, according to claim 7, wherein
   the stop control execution unit decreases the reaction torque to a value less than the reaction torque at the time of stop control, after switching the lock mechanism from the unlocked state to the locked state.

9. The steering input device for steer-by-wire, according to claim 1, wherein
   when the starting switch of the vehicle is switched to the OFF state, the stop control execution unit increases the reaction torque without allowing the reaction torque to be less than a value of the reaction command signal generated by the reaction command signal generation unit.

10. The steering input device for steer-by-wire, according to claim 1, wherein
the steering actuator includes a steered wheel lock mechanism for regulating steering of the steered wheel, and
the stop control execution unit operates the steered wheel lock mechanism to regulate steering of the steered wheel after switching the lock mechanism from the unlocked state to the locked state.

11. The steering input device for steer-by-wire, according to claim 1, wherein
after the starting switch of the vehicle is switched to the OFF state and during an increase of the reaction torque, when the steering operation is performed, the operation amount signal transmission unit transmits the operation amount signal to the control device of the steering actuator.

12. The steering input device for steer-by-wire, according to claim 1, wherein
the controller further includes a phase adjustment unit, and
after the starting switch is switched to the OFF state, when the steering wheel is steered, the phase adjustment unit performs phase adjustment control to control driving of the steering actuator based on the operation amount signal to suppress an increase in a phase shift between the steering wheel and the steered wheel.

13. The steering input device for steer-by-wire, according to claim 12, wherein
when executing the phase adjustment control, the phase adjustment unit controls driving of the steering actuator such that a steering angular speed of the steered wheel does not exceed a predetermined value.

14. The steering input device for steer-by-wire, according to claim 1, wherein
the stop control execution unit switches the lock mechanism from the unlocked state to the locked state in which a remote controller for locking and releasing a door lock of a vehicle is apart from the vehicle by a predetermined distance or when the door lock of the vehicle is locked.

15. The steering input device for steer-by-wire, according to claim 1, wherein
the steering actuator includes an electric motor for steering that generates a steering force, and a clutch mechanism,
the clutch mechanism is able to regulate rotation of the electric motor for steering by being engaged with a rotor of the electric motor for steering, and
the stop control execution unit regulates steering of the steered wheel by allowing the clutch mechanism to be in an engaged state after switching the lock mechanism from the unlocked state to the locked state.

16. The steering input device for steer-by-wire, according to claim 1, wherein
the controller further includes a start control execution unit, and
the start control execution unit increases the reaction torque after the starting switch is switched to an ON state.

17. The steering input device for steer-by-wire, according to claim 16, wherein
the start control execution unit decreases the reaction torque after the lock mechanism is switched from the locked state to the unlocked state.

18. The steering input device for steer-by-wire, according to claim 16, wherein
the controller further includes a phase adjustment unit,
after the starting switch is switched to the ON state, the phase adjustment unit performs phase adjustment control to control driving of the steering actuator such that the phase shift between the steering wheel and the steered wheel is decreased, and
the start control execution unit switches the lock mechanism from the locked state to the unlocked state after the phase adjustment control ends.

19. The steering input device for steer-by-wire, according to claim 16, wherein
the controller further includes a phase adjustment unit,
after the starting switch is switched to the ON state, the phase adjustment unit performs phase adjustment control to control driving of the steering actuator such that the phase shift between the steering wheel and the steered wheel is decreased, and
the start control execution unit decreases the reaction torque after the phase adjustment control ends.

20. The steering input device for steer-by-wire, according to claim 16, wherein
the start control execution unit performs processing to make the vehicle unable to travel until the lock mechanism is switched from the locked state to the unlocked state.

21. The steering input device for steer-by-wire, according to claim 16, wherein
the steering actuator includes a steered wheel lock mechanism for regulating steering of the steered wheel, and
after the start control execution unit switches the steered wheel lock mechanism from the locked state in which steering of the steered wheel is regulated to the unlocked state in which steering of the steered wheel is allowed, the start control execution unit switches the lock mechanism to the unlocked state, and then decreases the reaction torque.

* * * * *